United States Patent
Sanderson et al.

(10) Patent No.: US 7,424,850 B2
(45) Date of Patent: Sep. 16, 2008

(54) FIBER BALE AND A METHOD FOR PRODUCING THE SAME

(75) Inventors: William S. Sanderson, Blacksburg, VA (US); Johan Detaille, Zonhoven (BE)

(73) Assignee: Celanese Acetate LLC, Dallas, TX (US)

( * ) Notice: Subject to any disclaimer, the term of this patent is extended or adjusted under 35 U.S.C. 154(b) by 126 days.

(21) Appl. No.: 11/125,001

(22) Filed: May 9, 2005

(65) Prior Publication Data
US 2006/0249406 A1 Nov. 9, 2006

(51) Int. Cl.
*B65B 13/02* (2006.01)
*B65B 13/20* (2006.01)

(52) U.S. Cl. ............................. 100/3; 100/295; 53/438

(58) Field of Classification Search .................. 100/1, 100/2, 3, 295; 53/436, 438, 523, 529, 526
See application file for complete search history.

(56) References Cited

U.S. PATENT DOCUMENTS

| 159,378 | A | | 2/1875 | Baldwin |
|---|---|---|---|---|
| 206,658 | A | | 8/1878 | Blossom |
| 705,134 | A | * | 7/1902 | Pope et al. .................. 100/3 |
| 2,947,241 | A | | 8/1960 | Guenther et al. |
| 2,947,242 | A | | 8/1960 | Guenther et al. |
| 3,063,363 | A | | 11/1962 | Lamb |
| 3,351,992 | A | | 11/1967 | Carter |
| 3,991,670 | A | | 11/1976 | Stromberg |
| 4,092,912 | A | | 6/1978 | Simich |
| 4,162,603 | A | * | 7/1979 | Stromberg .................. 53/438 |
| 4,324,176 | A | | 4/1982 | McCormick |
| 4,366,751 | A | | 1/1983 | Spaller, Jr. |
| 4,393,767 | A | | 7/1983 | Dutfield |
| 4,577,752 | A | | 3/1986 | Meredith, Jr. |
| 5,701,723 | A | | 12/1997 | Simpson |
| 5,732,531 | A | | 3/1998 | de Silva et al. |
| 5,852,969 | A | | 12/1998 | Anthony |
| 6,474,226 | B1 | | 11/2002 | Sutton et al. |

(Continued)

FOREIGN PATENT DOCUMENTS

DE 29615598 U1 2/1997

(Continued)

OTHER PUBLICATIONS

C. L. Browne, "The Design of Cigarettes," Hoechst Celanese Corporation, (Apr. 17, 1990).

*Primary Examiner*—Jimmy T Nguyen
(74) *Attorney, Agent, or Firm*—Hammer & Associates, P.C.

(57) ABSTRACT

The instant application relates to a fiber bale and a method for producing the same. The instant fiber bale includes a highly compressed hexahedral fibrous material substantially free of disrupting curvatures on a top side or a bottom side. The highly compressed hexahedral fibrous material has a packing density of at least 300 kg/m$^3$. The method for producing a fiber bale according to instant invention includes the following steps: (1) providing a press for producing a highly compressed hexahedral fibrous material comprising at least one convex bale platen; (2) filling the press with the fibrous material; (3) pressing the fibrous material via the press; (4) thereby forming the highly compressed hexahedral fibrous material; (5) packaging the highly compressed hexahedral fibrous material with a wrapping material; and (6) securing the wrapping material thereby producing the fiber bale.

5 Claims, 3 Drawing Sheets

U.S. PATENT DOCUMENTS

2006/0243142 A1  11/2006  Mullins et al.

FOREIGN PATENT DOCUMENTS

| GB | 896228 | 5/1962 |
| JP | 2004-34062 | 8/2005 |
| WO | 02/32238 | 4/2002 |
| WO | WO 03/089309 A2 | 10/2003 |

* cited by examiner

FIBER BALE AND A METHOD FOR PRODUCING THE SAME

FIELD OF INVENTION

The instant application relates to a fiber bale and a method for producing the same.

BACKGROUND OF THE INVENTION

Fibrous material, e.g. synthetic fibers and natural fibers, are sold and delivered to customers in compressed bales.

Different methods are employed to produce high-density fiber bales. In general, a fibrous material is pressed into a bale, and covered with a protective wrapping. However, the conventional methods fail to produce a high-density fiber bale substantially free of disrupting curvatures on a top side or a bottom side. Disrupting curvature on either the top side or the bottom side is problematic because it interferes with the storage of high-density fiber bales on top of each other, and it promotes debating complications, for example in acetate tow bales.

U.S. Pat. No. 3,991,670 discloses a pressing apparatus for compressing a mass of fibrous material, such as cellulose pulp, into a bale and wrapping the resulting bale with a wire or strap. There is used a bale press stand, a stationary first press plate movable toward, and away from said press plate, together with means for moving said second press plate. The second press plate has a pressure-applying face constituted by a planar border surface normal to the direction of movement of said second press plate and a centrally disposed portion projecting 10-50 mm from the plane of said border surface, for effecting a permanent depression, centrally in an end surface of a bale formed in said apparatus, facilitating the gripping and lifting of a wire or strap which is wrapped around a number of such bales.

U.S. Pat. No. 4,577,752 discloses an improved high density tow bale wrapped with cardboard or the like covering and held in compressed condition by multiple strappings which extend around the bale, the tow bale having on its bottom a pattern of multiple pads for supporting the bale on a floor and unrelieved areas between the pads for receiving the strappings therealong.

U.S. Pat. No. 5,852,969 discloses a bale press for compressing material such as cotton. The press includes a base frame structure and a pair of platens, which have generally rectangular bale compressing faces for compressing a cotton bale to facilitate the bale tying operation. A plurality of elongated, wedged-shaped, bale compression members are provided at least on one of the platens. These bale compression members protrude outwardly from the platen where they are mounted to provide a compression area, which is sufficiently small so that the cotton bale is compressed only in close proximity to the positions where a single bale tie is to be placed. A sufficient number of bale compression members are provided to facilitate the application of the ties required for the bale.

German Utility Patent No. DE 296 15 598 U1 discloses the use of a conical shape compression shield and ejector to facilitate not only the compression of the materials downwardly, but also in the direction toward the side walls of the press.

International Publication No. WO 03/089309 discloses a highly compressed cuboid-shaped filter tow bale having a top side and a bottom side free from noisome curvatures and constrictions. This bale is entirely wrapped with a mechanically self-supporting, elastic packing material, which is provided with one or several convectively airtight connections. The method for producing the highly compressed cuboid-shaped filter tow bale includes the following steps: a) filter tow is supplied in a compressed form; b) the compressed filter tow is enveloped in a wrapping; c) the wrapping is closed in an airtight manner; and d) the wrapped bale is relieved of the load (e.g., by application of vacuum).

Despite the research efforts in developing high-density fiber bales suitable for storage and delivery, there is a still a need for a fiber bale, which is relatively easy to manufacture at a low cost. Furthermore, there is still a need for a method of producing high-density fiber bales suitable for storage and delivery, which requires the least amount of modifications of the current techniques and equipments, e.g. press, employed in producing high-density fiber bales.

SUMMARY OF THE INVENTION

The instant application relates to a fiber bale and a method for producing the same. The instant fiber bale includes a highly compressed hexahedral fibrous material substantially free of disrupting curvatures on a top side or a bottom side. The highly compressed hexahedral fibrous material has a packing density of at least 300 kg/m$^3$. The method for producing a fiber bale according to instant invention includes the following steps: (1) providing a press for producing a highly compressed hexahedral fibrous material comprising at least one convex bale platen; (2) filling the press with the fibrous material; (3) pressing the fibrous material via the press; (4) thereby forming the highly compressed hexahedral fibrous material; (5) packaging the highly compressed hexahedral fibrous material with a wrapping material; and (6) securing the wrapping material thereby producing the fiber bale.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
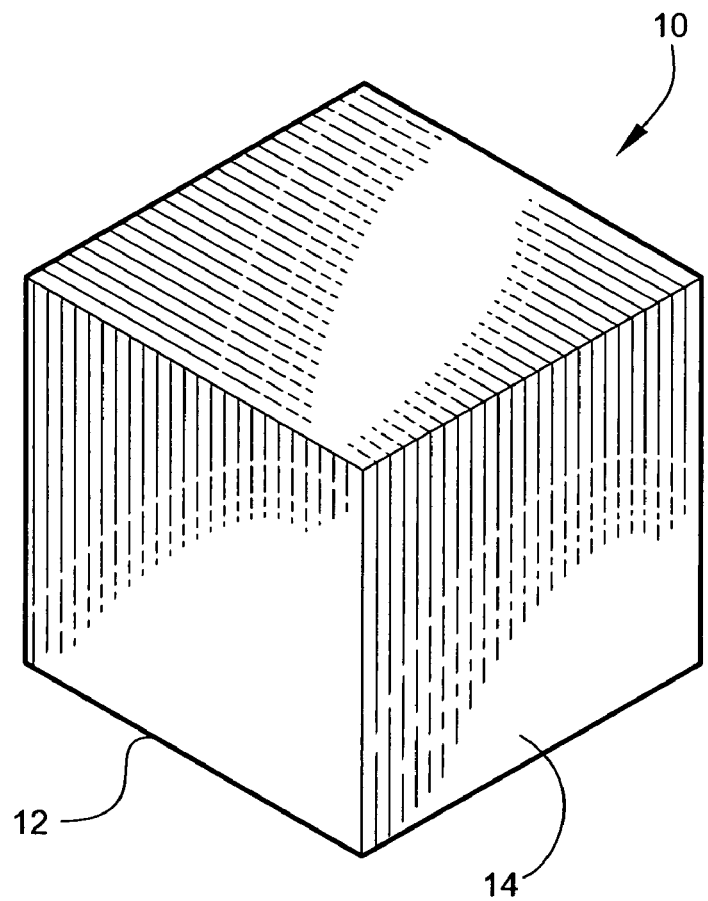
FIG. 1 is a fiber bale according to instant invention.

Referring to the drawings wherein like numerals indicate like elements, there is shown, in FIG. 1, a preferred embodiment of a fiber bale 10. The fiber bale 10 includes a highly compressed hexahedral fibrous material 12 substantially free of disrupting curvatures on a top side or a bottom side. The highly compressed hexahedral fibrous material 12 has a packing density of at least 300 kg/m$^3$, and it is completely encased with a wrapping material 14. The wrapping material is preferably secured with a fastener (not shown). Additionally, the fiber bale 10 may include a vacuum, or in the alternative, it may be vacuum free.

Substantially free of disrupting curvatures, as used herein, refers to a surface, which may be flat, slightly concaved, or slightly convexed.

Vacuum, as used herein, refers to a reduced pressure generated by the removal of air, e.g. suctioning via an air pump or vacuum generated by retraction of bale platens.

The highly compressed hexahedral fibrous material 12 may be composed of any fibrous material. Fibrous material, for example, includes natural fibers and synthetic fibers. Natural fibers include, but are not limited to, silk, wool, cotton, flax, jute, and ramie. The listed natural fibers are not regarded as limiting. Synthetic fibers include, but are not limited to, polymers synthesized from chemical compounds, e.g. acrylic, nylon, polyester, polyethylene, polylactic acid, polyurethane, and polyvinyl fibers, modified or transformed natural polymers, e.g. alginic and cellulose-based fibers such as acetates or rayons, and minerals, e.g. glasses. The listed synthetic fibers are not regarded as limiting. A preferred fibrous material is cellulose acetate tow.

Wrapping material 14 may be any material that is durable enough to contain the highly compressed hexahedral fibrous material 12. Wrapping material 14 may be a material selected from the group consisting of an air-permeable material, an air-impermeable material, and combinations thereof. For example, wrapping material 14 may be a material selected from the group consisting of a film, a cardboard, a woven material, a non-woven material, a foil material, and combinations thereof. A film, for example, may be a polymeric film such as a polyethylene film. A woven material is a fabric composed of two sets of yarns interlaced with each other to form the fabric. A non-woven material is the assembly of textile fibers held together by mechanical interlocking in a random web or mat, for example by fusing thermoplastic fiber to each other. Foil material may be any metallic material. The listed wrapping materials 14 are not regarded as limiting. Wrapping material 14 may include at least two portions, e.g. a top portion, and a body portion, or in the alternative, wrapping material 14 may include at least three portions, e.g. a top portion, a girth portion, and a bottom portion.

Wrapping material 14 may further include the means for releasing vacuum. Means for releasing vacuum includes, but is not limited to, an opening (not shown). The opening may be a sealable opening, e.g. via a plug.

Wrapping material 14 is preferably secured around the highly compressed hexahedral fibrous material 12 via a fastener (not shown). For example, wrapping material 14 may be secured around the highly compressed hexahedral fibrous material 12 via an air-permeable fastener (not shown). Air-permeable fastener may be any means for securing the wrapping material 14 around the hexahedral fibrous material 12. For example, air-permeable fastener may be selected from the group consisting of Velcro, pin, hook, strap, and the like. The listed air-permeable fasteners are not regarded as limiting. In the alternative, wrapping material 14 may be secured around the highly compressed hexahedral fibrous material 12 via an air-impermeable fastener (not shown). Air-impermeable fastener may be any means for securing the wrapping material 14 around the hexahedral fibrous material 12. For example, air-impermeable fastener may be selected from the group consisting of adhesive, melt bonding, and the like. The listed air-impermeable fasteners are not regarded as limiting.

Figure 2:
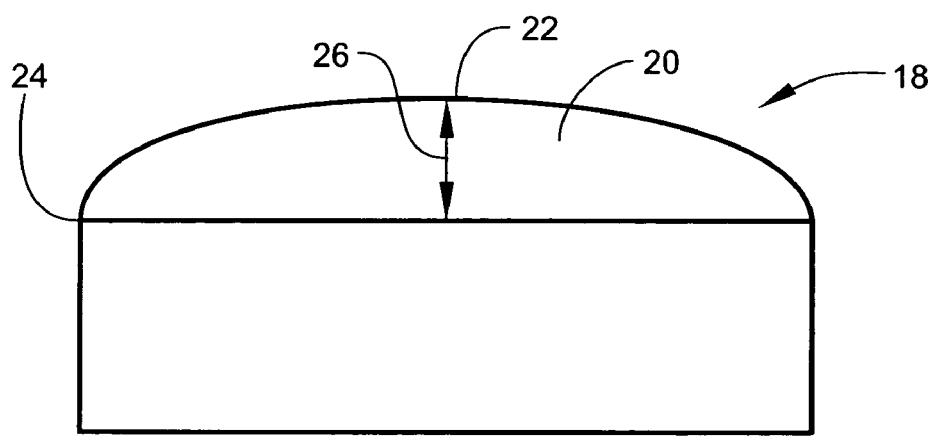
FIG. 2 schematically illustrates a cross sectional view of a convex bale platen.
Figure 3:
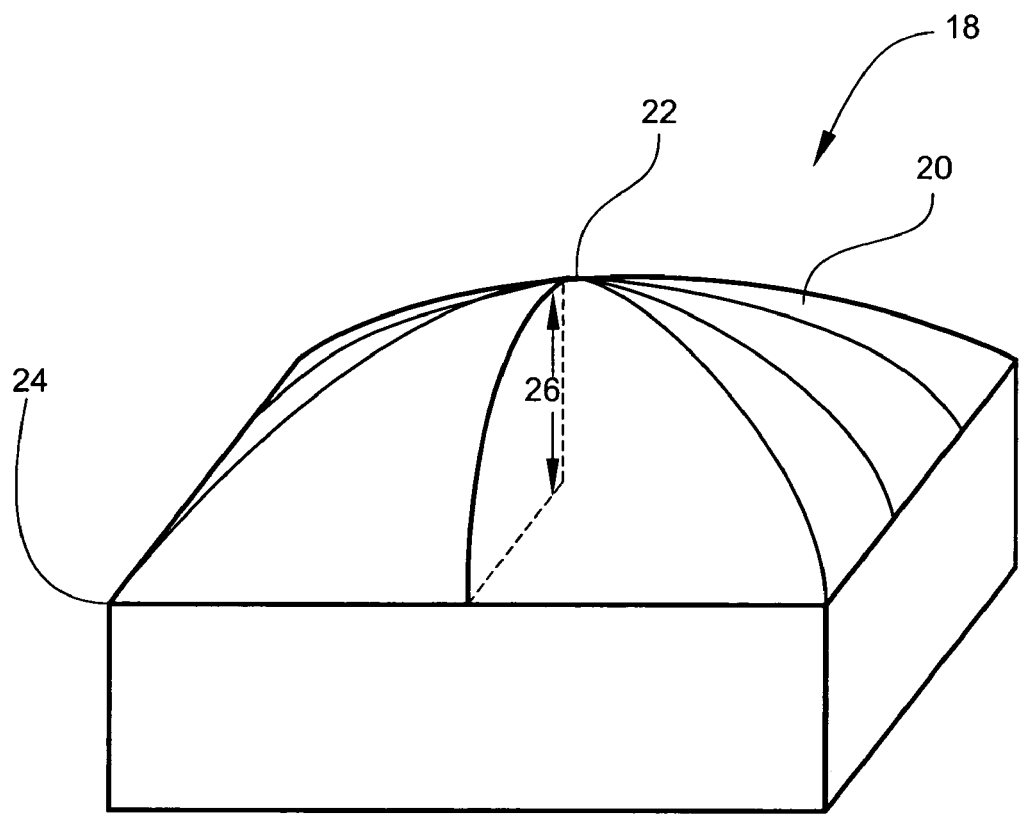
FIG. 3 schematically illustrates a perspective view of a convex bale platen.
Figure 4:
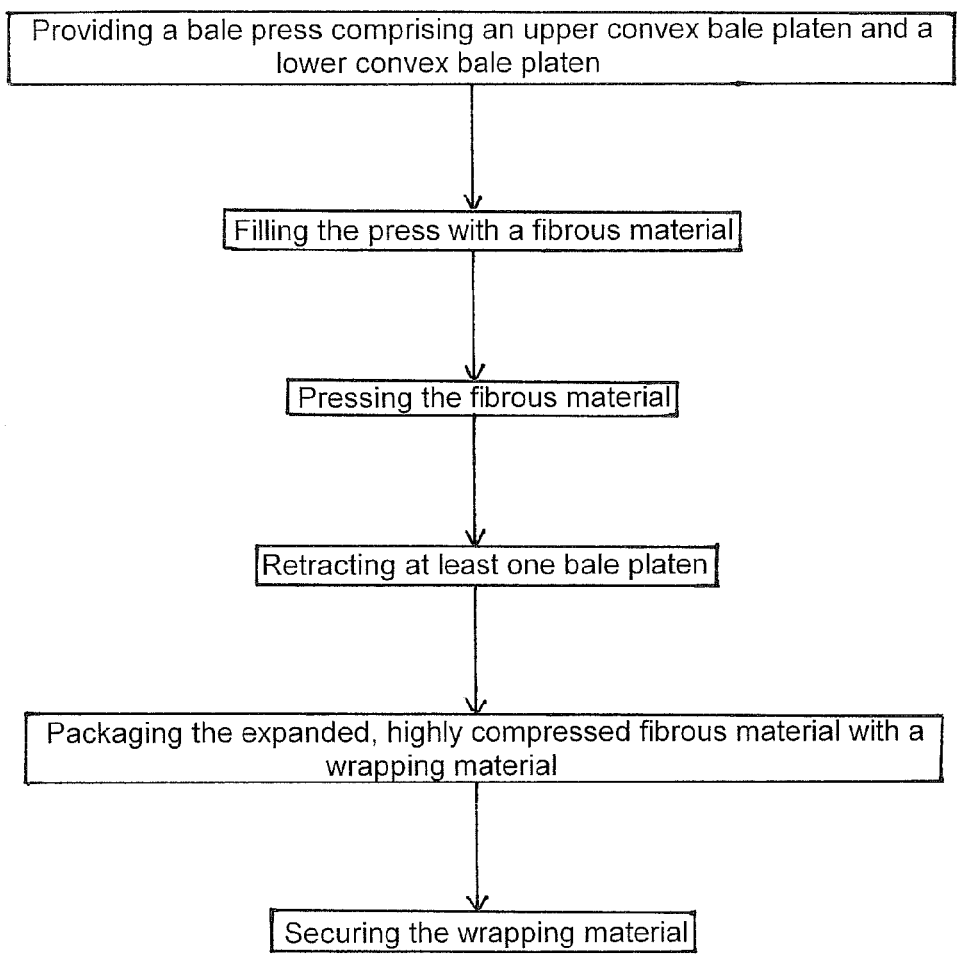
FIG. 4 schematically illustrates a method for producing a fiber bale.

Referring to FIGS. 2 and 3, a conventional press (not shown) including at least one convex bale platen 18 is employed to facilitate the production of fiber bale 10. A conventional press generally includes an upper platen and a lower platen, and either the upper platen or the lower platen may be a convex bale platen 18. In the alternative, however, both upper platen and lower platen may be convex bale platens 18. The convex bale platen 18 includes a convex surface 20, discussed in greater detail below. Convex surface 20, as used herein, refers to a surface curving outwardly, e.g. the surface of a sphere. Convex surface 20 is a smooth surface, e.g. continuous, faceted, or stepped. Convex surface 20 has a high point 22, and a base 24. The distance 26 between the high point 22 and the base 24 is about 1 cm to about 10 cm. For example, the distance 26 between the high point 22 and the base 24 may be about 5 cm. Convex surface 20 may be an integral component of convex bale platen 18; or in the alternative, it may be a separate component secured to convex bale platen 18 via the conventional methods. Convex surface 20 produces a temporary concave surface on the highly compressed hexahedral fibrous material 12, which may gradually diminish within a short period of time due to the internal pressure of the highly compressed hexahedral fibrous material 12 thereby producing the fiber bale 10. Convex surface 20 may include a groove or a channel (not shown) to facilitates the placement of a strap (not shown) upon fiber bale 10. Preferably, convex surface 20 may include a plurality of grooves or channels (not shown) to facilitate the placement of plurality of straps (not shown) upon fiber bale 10. Convex surface 20 may further include the means to generate strap slots (not shown) onto the fiber bale 10. Means to generate strap slots include, but are not limited to, patterns, and impressions. Strap slot, as used herein, refers to a depression, e.g. a groove or a channel, on fiber bale 10, which also facilitates the placement of a strap upon fiber bale 10.

In production, fibrous material is conveyed to a conventional press including at least one convex bale platen 18. The upper platen and the lower platen are dressed with the wrapping material 14. Conventional press including at least one convex bale platen 18 exerts a total pressure in the range of about 70 psi to about 700 psi on the fibrous material for a period of about 1 second to about several minutes thereby pressing the fibrous material into a highly compressed hexahedral fibrous material 12. Subsequently, the conventional press including at least one convex bale platen 18 is retracted to allow the highly compressed fibrous material 12 to expand about 0 to about 25% by height. Next, the highly compressed hexahedral fibrous material 12 is packaged with the wrapping material 14. Subsequently, the wrapping material 14 is secured with a fastener thereby producing fiber bale 10. Vacuum may further be drawn on fiber bale 10; or in the alternative, fiber bale 10 may be vacuum free.

EXAMPLES

Two fiber bale samples, as described hereinbelow in detail, were prepared, and the growth of the top surface of each fiber bale sample was measured to determine the increase in the height of their crown as a function of time. The results of the aforementioned test are shown below in Table I. The conditions for producing fiber bale samples 1 and 2 were exactly identical. Fiber bale sample 1 was produced using standard flat platens, and fiber bale sample 2 was produced using a top convex bale platen, according to instant invention.

TABLE I

| Example No. | In Press | Immediately Out of Press | After 1 Hour Out of Press | After 4 Hours Out of Press | After 24 Hours Out of Press | After 48 Hours Out of Press |
|---|---|---|---|---|---|---|
| 1 | 0 cm | 4 cm | 4.5 cm | 5.2 cm | 5.5 cm | 6 cm |
| 2 | 0 cm | 0 cm | 0.5 cm | 2 cm | 2.5 cm | 3 cm |

The present invention may be embodied in other forms without departing from the spirit and the essential attributes thereof, and, accordingly, reference should be made to the appended claims, rather than to the foregoing specification, as indicated the scope of the invention.

We claim:

1. A method for producing a fiber bale comprising the steps of:
    providing a bale press comprising an upper convex bale platen and a lower convex bale platen, each of the convex bale platens includes a convex surface, the convex surface having a high point and a base, a distance between the high point and the base is about 1 cm to about 10 cm;
    filling said press with a fibrous material;
    pressing said fibrous material via said press by exerting a total pressure in a range of about 70 psi to about 700 psi on said fibrous material for about 1 second to about several minutes;
    thereby producing a highly compressed fibrous material;
    retracting at least one of said bale platens thereby allowing said highly compressed fibrous material to expand about 0 to 25 percent by height;
    packaging said expanded highly compressed fibrous material with a wrapping material;
    securing said wrapping material, thereby producing a highly compressed hexahedral fibrous material substantially free of disrupting curvatures on a top side or a bottom side, wherein a crown height of said highly compressed hexahedral fibrous material being at least 50 percent less than a crown height of a bale pressed by standard flat platens after a period of 48 hours out of said press.

2. The method for producing a fiber bale according to claim 1, wherein said fiber bale being vacuum free.

3. The method for producing a fiber bale according to claim 1, wherein said method further including the step of drawing vacuum on said fiber bale.

4. The method for producing a fiber bale according to claim 1, wherein said wrapping material being selected from the group consisting of an air-permeable material, an air-impermeable material, and combinations thereof.

5. The method for producing a fiber bale according to claim 1, wherein said fibrous material being cellulose acetate filament tow.

* * * * *